(12) United States Patent
Corrie

(10) Patent No.: US 6,993,682 B2
(45) Date of Patent: Jan. 31, 2006

(54) AUTOMATED TEST GENERATION

(75) Inventor: Benjamin John Corrie, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/294,979

(22) Filed: Nov. 14, 2002

(65) Prior Publication Data

US 2003/0233635 A1 Dec. 18, 2003

(30) Foreign Application Priority Data

Jun. 14, 2002 (GB) ................................ 0213688

(51) Int. Cl.
*G06F 11/30* (2006.01)

(52) U.S. Cl. .................................. 714/38; 717/124
(58) Field of Classification Search ................ 714/38; 717/124, 126, 127, 131, 133, 141; 719/315, 719/328
See application file for complete search history.

(56) References Cited

U.S. PATENT DOCUMENTS

| | | | | |
|---|---|---|---|---|
| 5,652,835 A | * | 7/1997 | Miller | 714/38 |
| 5,905,856 A | * | 5/1999 | Ottensooser | 714/38 |
| 6,223,337 B1 | * | 4/2001 | Blume | 717/126 |
| 2003/0005380 A1 | * | 1/2003 | Nguyen et al. | 714/736 |
| 2005/0022166 A1 | * | 1/2005 | Wolff et al. | 717/124 |

* cited by examiner

*Primary Examiner*—Scott Baderman
(74) *Attorney, Agent, or Firm*—Leslie A. VanLeeuwen

(57) ABSTRACT

A system and method for automated FVT test generation by distributed processing among a master (100) and one or more slave (200) JVMs which communicate via RMI. Using reflection analysis, the master (100) sequentially tests each of a plurality of classes, instructs the slave to test each of the plurality of classes, compares the results of the testing at the master and slave and in dependence thereon adds the class to a pool (110) of classes for subsequent use. This provides the advantage that the test application may be set running and allowed to continue automatically. The more objects that are serialised, the more variations and permutations can be tested and theoretically, there is no limit to the amount of testing that can be done. Rather than having a static set of tests that are run over and over, the tests are constantly changing which increases the likelihood of finding bugs.

25 Claims, 3 Drawing Sheets

AUTOMATED TEST GENERATION

FIELD OF THE INVENTION

This invention relates to testing of software, and particularly automated testing of software.

BACKGROUND OF THE INVENTION

In order to perform function verification testing (FVT) of software, it is known that manually looking at a class (a software function), analysing the methods and then creating tests which all then need to be compiled and run is a very time-consuming process. It also means that once a suite of tests have been written, they cannot be modified or augmented. The same tests are run again and again, ad infinitum and the number of tests is always going to be limited.

The Java (trade mark) language has a set of classes for examining classes themselves, the 'Reflection API (application programming interface)', which can be exploited for simple automated testing. Using this API, a list of public methods can be obtained and their return values and input values can be determined. Other properties (such as whether the class is serializable, synchronised, etc.) are also obtainable. It should therefore be possible to query a class about its public API and using that information, test the API automatically by giving each method and constructor a variety of expected input values and by analysing the output.

However, this approach has the disadvantage(s) that:

1) This cannot be done very intelligently when implemented as an automatic process. When tests are written manually, input values are carefully chosen and the effects on an object can be also measured carefully—this is because the test writer understands the function and intention behind the public API.

2) Many classes require other classes as input, which in turn require other classes as input, etc. This can make automated testing quite complicated. If an instance of class A is needed to create an instance of class B to test an instance of class C, it is uncertain how this should be automated and what values should be used.

3) Once the class has been examined and it has been decided what is to be tested and how it is to be tested, it is uncertain what it should be compared against.

4) When the tests are being created, it is uncertain how they should be stored.

5) It is uncertain where testing should start.

A need therefore exists for a system and method for automated FVT test generation wherein the abovementioned disadvantage(s) may be alleviated.

STATEMENT OF INVENTION

The present invention provides a system for sequentially testing each of a plurality of software functions, and producing result information from the testing, the system including a master processor which comprises: a unit for instructing a slave processor to perform testing thereat for each function tested at the master processor; a unit for receiving from the slave processor the result information from the testing thereat; a unit for comparing the result information from the testing at the master processor with result information from the testing at the slave processor; and a unit for adding, dependent on comparison in the comparing unit, a tested function to a pool of functions for subsequent use.

The present invention also provides a corresponding method and a computer program product for instructing a computer to carry out the method.

BRIEF DESCRIPTION OF THE DRAWINGS

One system and method for automated FVT test generation incorporating the present invention will now be described, by way of example only, with reference to the accompanying drawings, in which.

DESCRIPTION OF PREFERRED EMBODIMENT

Figure 1:
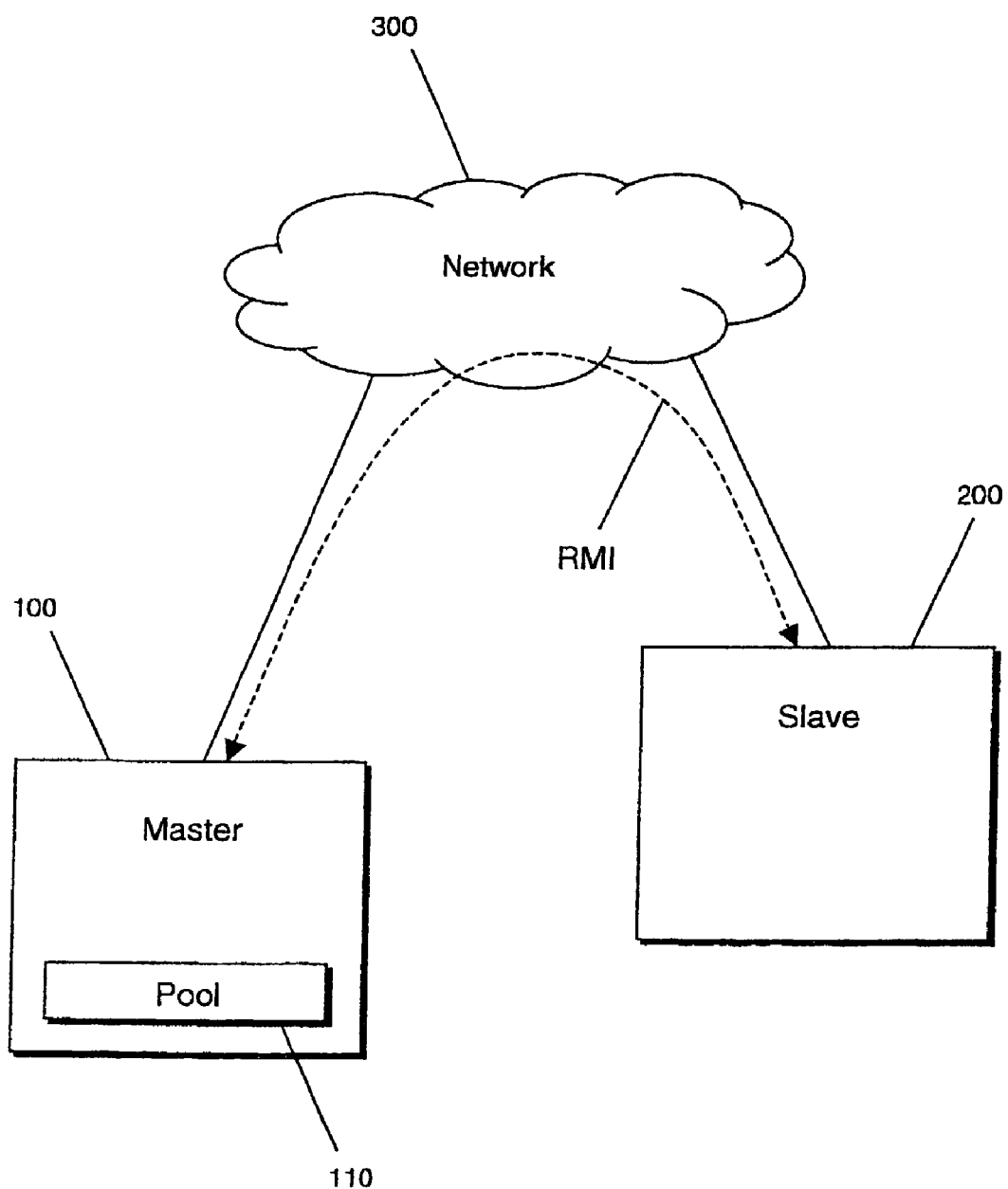
FIG. 1 shows a block schematic illustration of an automated FVT test generation system based on a distributed Java application that runs on more than Java virtual machine (JVM), used in describing a preferred embodiment of the present invention.

Referring firstly to FIG. 1, a novel system for automated FVT test generation is based on a distributed Java application that runs on more than one computer in a master-slave (client/server) configuration. The master 100 runs in a reference Java virtual machine (JVM), which creates the tests and manages results analysis. The slave 200 runs in a test JVM which runs the tests that the master has created. The master and slave JVMs (of which only one is shown) are coupled to a computer network shown generally as 300.

The output from the tests and the state of the objects under test (on both VMs) are constantly analysed and any inconsistencies between the objects under test and the object in the reference JVM are recorded as problems. The master also builds up a pool 110 of unique serialised objects which are written to disk and can be used as input to other tests. These are stored in a directory structure reflecting the class hierarchy. The communication between the VMs 100 and 200 is managed using remote method invocation (RMI—a known Java feature), which means that serialised objects can be passed back and forth between them.

The power of this methodology lies in the ability of Java to instantiate a class given a fully qualified name as a String, and then to run methods generically on that object without having to worry about what they are called.

Initial Values

The master starts with a small number of fundamental values. For each primitive type, it will have a variety of values including boundary values. It will also start with a small number of serialised fundamental classes, such as 'java.lang.String' that will be used to start the process.

Master

Figure 2:
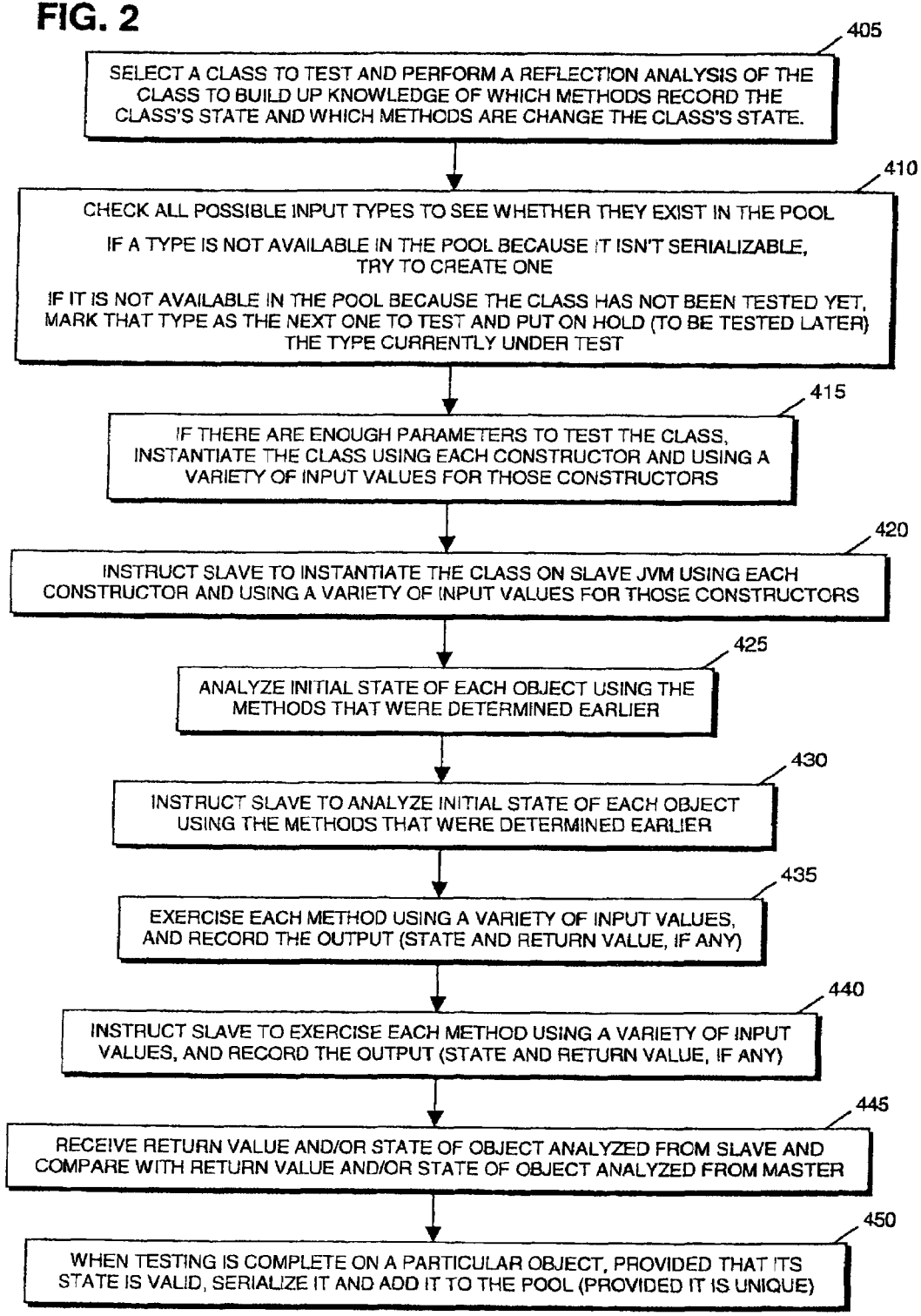
FIG. 2 shows a flow chart illustrating the method followed by a master JVM of the system of FIG. 1.

Referring now also to FIG. 2, the master 100 selects a class to test and performs a reflection analysis (i.e., using the Reflection API) of the class to build up knowledge of which methods record the class's state and which methods are designed to change the class's state—step 405. Each class should have an "equals" method (a known Java method) which allows it to be compared to other classes of the same type, or classes implement the "Comparable" interface (a known Java interface), which also allows this.

Another important check at the start is to ascertain whether the objects exist to be able to test this class. All possible input types are checked to see whether they exist in the pool—step 410. If a type is not available in the pool because it isn't serializable, the master will try to create one (this could become a little recursive). If it is not available in the pool because the class has not been tested yet, that type is marked as the next one to test and the one currently under test is put on hold to be tested later.

If there are enough parameters to test the class, the master will instantiate the class (unless it is abstract) using each constructor and using a variety of input values for those constructors—step 415. The constructors may require an object as input, in which case, a serialised object is chosen from the pool.

The initial state of each object is analysed using the methods that were determined earlier (at step 405).

Each method is then exercised using a variety of input values and the output from the VM is recorded—step 435. Some methods will have return values that can be analysed, whereas others will affect the state of the object. Whichever is the case, both the state and the return value (if that exists) is recorded after each invocation of each method.

As shown, whenever a class is instantiated or a method is run, the master instructs the slave to do likewise with the test JVM (steps 420, 430 and 440). Additionally, whenever a return value is recorded and/or the state of an object is analysed, the same happens on the slave and the results from the two VMs are compared—step 445. If the results and/or state are not serializable, an algorithm for measuring the state of the object that produces a comparable value must be used. (This problem arises since, to be able to compare the output from the Master and the Slave, the state/results must be communicated between the Master and Slave via RMI. For this to work, the data must be serializable. If the object under test cannot be passed as a whole, then the state of the object must be reduced to a tree of data which is both serializable and can be compared to other such trees. In fact, as well known, the process of turning an object's state into a flat file of data is the very concept of serialization, but not all objects are serializable. Hence an algorithm which can translate an object's state into a tree of data would be required. The algorithm would take all of the information it could get from the object and record it in a tree structure of data. This same algorithm could then be applied to the object under test on the Master and the Slave and the resulting data trees compared. An algorithm suitable for this purpose can be readily provided, without further invention, by a person of ordinary skill in the art, and need not be described in further detail.)

Once the testing is complete on a particular object, provided that its state is valid (i.e., it has not been broken by the testing, in other words its return state/values are the same from the reference, master JVM 100 and from the test, slave JVM 200), it is serialized and added to the pool to be used as input to another class that may need it—step 450. Before it is added to the pool, it should also be checked that it is unique.

The master will record what is happening in a log file and if an inconsistency has occurred, then a complete trace of what was done to the class should be recorded. It is fundamentally important that inconsistencies are reproducable, so an audit trail of exactly how it was produced is extremely important.

Slave

Figure 3:
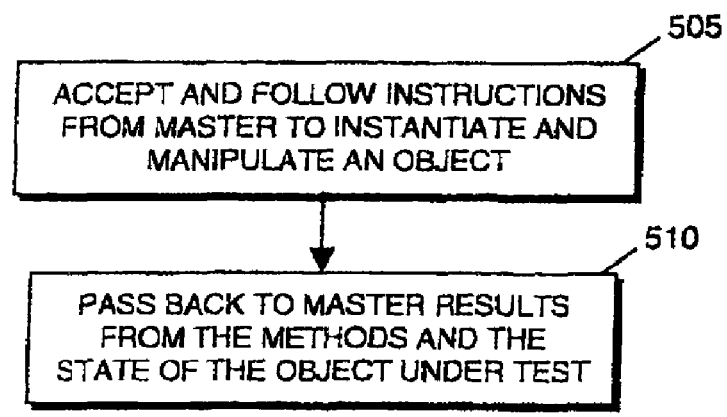
FIG. 3 shows a flow chart illustrating the method followed by a slave JVM of the system of FIG. 1.

Referring now also to FIG. 3, the slave 200 has much less to do than the master 100. The slave simply takes instructions on how to instantiate and manipulate (exercise) an object, which it then follows—step 505. The results from the methods and the state of the object under test are passed back to the master where analysis is performed on them—step 510. In this way, objects in both VMs should be being manipulated in exactly the same manner at the same point in time. The master has to wait for the results from the slave before starting the next test.

It will be understood that the slave could be run in a multi-JVM mode, where the RMI and communications are handled by a reference VM and a test VM is started for each test. This would be good for unstable or unreliable VMs, but would have a major impact on speed.

It will also be understood that the method described above for automatic FVT test generation is performed by a distributed master-slave software application written in Java program code. will also be understood that, although in the example described only one slave JVM is used, it is also possible to use more than one slave. It will also be understood that different slaves may operate on different hardware/software computer platforms if desired.

It will further be understood that the system of FIG. 1 as described above allows the earlier-discussed problems to be overcome in the following manner:

1) There are many ways to make sure that the testing is effective and not completely random. Firstly, if the state of an object is being constantly measured, it is known whether any changes are being made to it if the state changes. This means that a measurement can also be made of how well an object has been exercised—if the output is only affected from one method, while output from the others remains the same, the object has not been exercised very completely. This can also help to eradicate duplication—it is not desirable to spend valuable time testing an object that has the same state as one that has already been tested. In conclusion, the automated testing procedure described above will more random than manually written tests, but given the time saved, an advantage of the automatic testing is that many more permutations can be tried in the same timeframe.

2) This has been addressed in the Master section. If class C requires class B which requires class A, then A is tested first and the results used to test B the results of which can be used to test C.

3) The solution to this is to simply duplicate actions in two VMs—one which is a reference and one which is under test, and simply compare the results. This would happen on the fly, unlike conventional test-suites which have the expected values hard-coded into the tests.

4) The tests are not "created" or "stored" as such. The Master decides on some test "actions" and these operations are then carried out on identical objects on both the master and the slave.

Although in the present example it is not the intention to generate reusable tests, this may be done if desired (see below).

5) The best place to start testing would be with the most fundamental classes—so provide the known 'java.lang' package to the master and let it proceed as described automatically. By the time it worked through all of these classes, the pool of resource this would create would be most of what is needed to test the other packages.

A number of possible problems in practically implementing the above example may occur as follows:

1) Differences in serialisation between VMs—some VMs serialise classes slightly differently and they may therefore not be completely compatible with each other. However, this could be interpreted as a compatibility bug in itself.

2) The objects that inherit the 'equals' method from 'java.lang.Object' don't compare equality, they simply compare whether two reference variables point to the same object. This is no use in a testing context, so if an object inherits 'equals' from 'java.lang.Object', this method must be ignored.

3) Two options are possible for how the master passes instructions to the slave: the master may attempt to create Java code for the slave to actually run, or a format can be developed whereby the master's intentions for a particular class can be communicated without the need for any code to be created. latter is preferable and should be much faster.

4) For classes that aren't serializable and that must be used as parameters for other classes, a hash table of such classes can be kept. However, this hash table will be lost when the program terminates and would need to be recreated if the test program was restarted.

5) Difficulty may arise if there is a need to instantiate objects using constructors other than the default constructor, for example 'Class.forname( )' can only create an object with a 'no-args' constructor.

6) Since the master/slave software application itself is written in Java, this makes it easy to run on different platforms. However, the subtle differences between JVMs on different platforms means that the implementation of the slave has to be carefully written so that any differences are not interpreted as test failures.

7) Another problem is whether dynamic casting is possible. The input values and output values will have to be dealt with as 'java.lang.Object' references and so this could present a number of problems. Hopefully, these are problems that can be overcome by the reflection API when running 'method.invoke( )'.

It will be understood that the automatic FVT testing program described above may be extended so that instead of just running in a client-server mode, it can simply create testcases in Java code designed to run in a simple test harness, with parameters hard-coded into it. This could be good for randomly generating test-suites, but could also be used for when failures occur: it would be useful to be able to run the program in client-server mode, but as soon as the program encounters a problem, instead of just producing some output, it writes a testcase.

It will be understood that the method and system for automated FVT test generation described above provides the advantages that the application may be set running and allowed to proceed automatically. The more objects that are serialised, the more variations and permutations can be tested and theoretically there is no limit to the amount of testing that can be done. Therefore an advantage of this is that rather than having a static set of tests that are run over and over, the tests are constantly changing which increases the likelihood of finding bugs.

It will be appreciated that the software application, in Java program code, for performing the method described above for automatic FVT test generation will typically run on one or more processors (not shown), and that the software may be provided as a computer program element carried on any suitable data carrier (also not shown) such as a magnetic or optical computer disc.

It will also be appreciated that various modifications to the embodiment described above will be apparent to a person of ordinary skill in the art.

What is claimed is:

1. A system for sequentially testing each of a plurality of software functions, and producing result information from the testing, the system including a master processing means which comprises:

means for instructing a slave processing means to perform testing thereat for each function tested at the master processing means;
   means for receiving from the slave processing means the result information from the testing thereat;
   means for comparing the result information from the testing at the master processing means with result information from the testing at the slave processing means; and
   means for adding, dependent on comparison in the means for comparing, a tested function to a pool of functions for subsequent use.

2. The system of claim 1 wherein the master processing means and the slave processing means comprise Java virtual machines.

3. The system of claim 2 wherein the master processing means further comprises means for initially obtaining information on a class's methods.

4. The system of claim 3 wherein the means for initially obtaining information on a class's methods comprises means for obtaining information of which methods record the class's state and which methods change the class's state.

5. The system of claim 3 wherein the means for initially obtaining information on a class's methods is arranged to use reflection analysis.

6. The system of claim 2 wherein the master processing means further comprises means for checking all possible input types to determine whether they exist in the pool.

7. The system of claim 2 wherein the means for sequentially testing each of a plurality of software functions comprises means for instantiating a class using each constructor of the class and a variety of input values for the constructors.

8. The system of claim 2 wherein the means for sequentially testing each of a plurality of software functions comprises means for analysing the initial state of each object in the class using the class's methods.

9. The system of claim 2 wherein the means for sequentially testing each of a plurality of software functions comprises means for exercising each method using a variety of input values.

10. The system of claim 2 wherein the result information comprises at least one of:
    a return value, and an object's state.

11. The system of claim 2 wherein the master processing means and the slave processing means are arranged to communicate via remote method invocation.

12. The system of claim 1 wherein the slave processing means comprises:
    means for accepting instructions from the master processing means to instantiate and manipulate an object; and
    means for passing back to the master processing means result information including information on the state of the object.

13. A method, carried out by a master processor, for sequentially testing each of a plurality of software functions, and producing result information from the testing;
    wherein the method comprises steps of:
    instructing a slave processor to perform testing thereat for each function tested at the master processor;
    receiving from the slave processor the result information from the testing thereat;
    comparing the result information from the testing at the master processor with result information from the testing at the slave processor; and adding, dependent on the outcome of the step of comparing, a tested function to a pool of functions for subsequent use.

14. The method of claim 13 wherein the master processor and the slave processor comprise Java virtual machines.

15. The method of claim 14 wherein the method further comprises in the master processor further initially obtaining information on a class's methods.

16. The method of claim 15 wherein the step of initially obtaining information on a class's methods comprises obtaining information of which methods record the class's state and which methods change the class's state.

17. The method of claim 15 wherein the step of initially obtaining information on a class's methods uses reflection analysis.

18. The method of claim 14 wherein the method further comprises in the master processor checking all possible input types to determine whether they exist in the pool.

19. The method of claim 14 wherein the step of sequentially testing each of a plurality of software functions comprises instantiating a class using each constructor of the class and a variety of input values for the constructors.

20. The method of claim 14 wherein the step of sequentially testing each of a plurality of software functions comprises analysing the initial state of each object in the class using the class's methods.

21. The method of claim 14 wherein the step of sequentially testing each of a plurality of software functions comprises exercising each method using a variety of input values.

22. The method of claim 14 wherein the result information comprises at least one of:
a return value, and an object's state.

23. The method of claim 14 wherein the master processor and the slave processor communicate via remote method invocation.

24. The method of claims 13 wherein the method further comprises in the slave processor:
accepting instructions from the master processor to instantiate and manipulate an object; and
passing back to the master processor result information including information on the state of the object.

25. A computer program product stored on a computer readable storage element for, when run on a computer system, instructing the computer system to performing the method of claim 13.

* * * * *